(12) United States Patent
Matsumoto et al.

(10) Patent No.: US 6,798,969 B2
(45) Date of Patent: Sep. 28, 2004

(54) FIBER ARRAY, METHOD FOR FABRICATING THE SAME AND OPTICAL DEVICE USING THE FIBER ARRAY

(75) Inventors: Akira Matsumoto, Nagaya (JP); Masashi Fukuyama, Inuyama (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/976,462

(22) Filed: Oct. 12, 2001

(65) Prior Publication Data

US 2002/0085826 A1 Jul. 4, 2002

(30) Foreign Application Priority Data

Oct. 17, 2000 (JP) .................................. 2000-316970
Aug. 28, 2001 (JP) .................................. 2001-258465

(51) Int. Cl.⁷ ............................................ G02B 6/00
(52) U.S. Cl. .................................. 385/137; 385/136
(58) Field of Search ............................ 385/137, 80, 83, 385/85, 86, 87, 76, 77, 136

(56) References Cited

U.S. PATENT DOCUMENTS

| | | | | |
|---|---|---|---|---|
| 4,434,636 A | * | 3/1984 | Prunbauer | 70/358 |
| 4,970,040 A | * | 11/1990 | Voss | 264/142 |
| 4,984,219 A | * | 1/1991 | Brown et al. | 380/39 |
| 5,052,207 A | * | 10/1991 | Porucznik | 72/329 |
| 5,302,435 A | * | 4/1994 | Hashimoto | 428/167 |
| 5,532,173 A | * | 7/1996 | Martin et al. | 438/92 |
| 5,850,663 A | * | 12/1998 | Hardy et al. | 15/236.01 |
| 5,888,619 A | * | 3/1999 | Griffin | 428/172 |
| 6,489,215 B2 | * | 12/2002 | Mouli et al. | 438/400 |
| 6,523,861 B1 | * | 2/2003 | Clancy et al. | 285/93 |
| 6,528,327 B2 | * | 3/2003 | Nagano et al. | 438/3 |
| 6,552,467 B1 | * | 4/2003 | Suriano et al. | 310/249 |

FOREIGN PATENT DOCUMENTS

| | | | | |
|---|---|---|---|---|
| EP | 0 574 734 A1 | 12/1993 | | |
| EP | 0 626 600 A1 | 11/1994 | | |
| EP | 0729044 | 8/1996 | | |
| EP | 0 943 942 A2 | 9/1999 | | |
| GB | 2151040 A | 7/1985 | | |
| JP | 01023209 | 1/1989 | | |
| JP | 01023209 A | * | 1/1989 | ............ G02B/6/30 |
| JP | 01-126608 | 5/1989 | | |
| JP | 05303027 A | * | 11/1993 | ............ G02B/6/40 |
| JP | 07174944 | 7/1995 | | |
| JP | 07-174944 | 7/1995 | | |
| JP | 08292345 A | * | 11/1996 | ............ G02B/6/42 |
| WO | WO 90/04194 | 4/1990 | | |

OTHER PUBLICATIONS

S. Hirai, K. Kurima, M. Saito, D. Yui, T. Hattori, H. Suganuma, "Optical waveguide module and method of manufacturing the same", EP0626600A1, Nov 30, 1994.*

T. Ichiki, T. Abe, T. Ejiri, "Optical fiber array and its substrate", JP05303027A, Nov. 16, 1993.*

* cited by examiner

*Primary Examiner*—Thong Nguyen
*Assistant Examiner*—Arnel C. Lavarias
(74) *Attorney, Agent, or Firm*—Burr & Brown

(57) ABSTRACT

The present invention provides a fiber array, in which light reflections caused by exfoliation of the end face adhesive due to volume increases of a peripheral adhesive disposed around the fibers are prevented. Stripped fibers are positioned such that they protrude with respect to an end face of a V-groove substrate provided with V-grooves, and the peripheral adhesive is formed flush with the end face of the V-groove substrate without protruding. Then, after being subjected to high temperature and high humidity, the peripheral adhesive swells and expands in the longitudinal direction, so that it protrudes in outward direction from the end face of the V-groove substrate and the end face of the fiber array, but the tip of the peripheral adhesive does not swell beyond the tips of the stripped fibers, so that it does not exert any stress leading to exfoliation at the coupling face with the adhesive.

9 Claims, 5 Drawing Sheets

(a)

(b)

(a)

(b)

FIBER ARRAY, METHOD FOR FABRICATING THE SAME AND OPTICAL DEVICE USING THE FIBER ARRAY

BACKGROUND OF THE INVENTION

1. Field of the Invention

The present invention relates to fiber arrays used to fix one or more optical fibers in a line, and to connect the one or more optical fibers to an optical element, as well as to methods for fabricating such fiber arrays and optical devices using such fiber arrays.

2. Description of the Related Art

Conventional fiber arrays are mainly used to couple optical fibers to wave-guides of optical devices. As shown in a top view in FIG. 3(a), the corresponding lateral view in FIG. 3(b), and in FIGS. 4(a)–(c), the end faces of a fiber array and a waveguide substrate are optically fixed by an end face adhesive A, and the end faces of the optical fibers are up to about 10 μm removed from the end face of the waveguide D. As shown in FIG. 4(a), which is a front view, and in FIG. 4(c), which is a cross-section taken from above, stripped fibers 8 are placed in a V-groove substrate 1, and a fiber fixing substrate 2 fixes the stripped fibers 8 in the center of the V-grooves. The stripped fibers 8 are fastened by a peripheral adhesive B disposed around the stripped fibers 8, so that the gap between the V-grooves and the stripped fibers 8, in other words the periphery of the fibers, is filled with the peripheral adhesive B. Furthermore, coated fibers 9 are housed by an upper substrate 3, to which they are fixed with an adhesive. It should be noted that the upper substrate 3 is sometimes not needed, since the fiber fixing substrate 2 is used to fix the stripped fibers 8 securely in the center of the V-grooves 7.

The V-groove substrate 1 includes an upper plane 4 and a lower plane 6 that is recessed by a step 5 from the upper plane 4. V-grooves 7 are formed by mechanical machining using a grinding stone or the like, or by Si etching to house the stripped fibers 8 in the upper plane 4. The height of the step 5 is set to about half the diameter of the coated portion of the optical fiber. This height is adjusted such that the stripped fibers 8 are placed in the center of the V-grooves 7, when the coating of the optical fibers is put on the lower plane 6. Moreover, the fiber fixing substrate 2 is fastened tightly to the upper side of the upper plane 4 to fix the stripped fibers 8 in the center of the V-grooves 7. Then, grooves are formed in the lower side of the upper substrate 3, and the upper substrate 3 is placed on the lower plane 6 of the V-groove substrate 1.

As a method for fabricating such a fiber array, first the upper substrate 3 is placed on the lower plane 6 of a V-groove substrate 1, and the end face of the upper substrate 3 is adhered tightly to the step 5 of the V-groove substrate 1. Thus, both parts are positioned with respect to longitudinal direction. At the same time tunnel-shaped holes are formed by the lower plane 6 and the grooves in the lower surface of the upper substrate 3. If the optical fibers are introduced from the outside into these holes, then the stripped optical fibers 8 are matched with the centers of the V-grooves 7. Here, the coating housing portion is machined so that the grooves in the lower surface precisely match the coating of the fibers. Consequently, once the optical fibers are inserted, they are maintained in that state. Then after the fiber fixing substrate 2 is placed on the upper plane 4 of the V-groove substrate 1 to hold down the stripped fibers 8, a thermosetting or UV-setting resin adhesive B is injected and filled around the stripped fibers 8 to fix them adhesively.

Next, after polishing the surface joined to the waveguide D, both end faces of the fiber array and the waveguide D substrate are optically fixed with the end face adhesive A.

A problem is that over the passage of years, the peripheral adhesive B swells and its volume expands when the adhesive B is disposed around the fibers in the fiber array. If it protrudes out to the front, pressing against the end face adhesive A as shown in FIG. 4(c), a strong exfoliation stress acts on the adhesion interface between the end face adhesive A and the fiber end faces. It may lead to exfoliations 8b. More specifically, as shown in FIG. 4(b), the spaces for the fibers have the shape of triangular prisms. The peripheral adhesive B around the fibers protrudes from the portions corresponding to the three vertices in longitudinal direction while enclosing the fibers. As a result, stress concentrates locally on the adhesion surface where the fiber end face borders against the end face adhesive A. The fiber end face easily exfoliates from the end face adhesive A. Even at a microscopic level, if the core portion 8a of the fibers exfoliates, such exfoliations immediately cause light reflections, leading to a deterioration of the transmission signal from the light source. The volume taken up by the peripheral adhesive B is small when compared to the total volume of fiber array and waveguides. However, since it is disposed around the fibers, it can lead to the tremendous problem of light reflection by merely causing local exfoliation.

Furthermore, if the extent of the exfoliation of the fiber core is increased, other signal losses of the transmission light besides reflection may occur, which can also cause severe problems.

Moreover, if the fiber array and waveguide are coupled by "butt joints," in which the end faces are placed against one another, the volume increase of the peripheral adhesive B due to its aging creates forces around the fibers. This force directly expands the end face and may lead to deterioration of the adhesion and becomes a cause for exfoliation. Thus, in the case of butt joints, there is the risk of reflection and transmission light loss as well.

In order to perform an accelerated aging test, a fiber array housing 48 fibers was produced, which had a total longitudinal length of 12 mm, and in which the length of the distance over which the fibers were fixed in the V-grooves was 4 mm. For the peripheral adhesive B used in the assembly, an epoxy adhesive was selected that had a curing shrinkage ratio of 2%, a water absorption ratio of 0.5%, a thermal expansion coefficient of $1 \times 10^4$, and a Shore D85 hardness. When this sample fiber array was subjected to an accelerated aging test of 85° C/85%RH for 2 weeks, the change of the protrusion length of the adhesive in the direction protruding from the end face was 0.1 to 1μm. This is for a measurement under ordinary temperatures, but it seems that at elevated temperatures, an even larger protrusion may occur due to the influence of the thermal expansion. It seems that this protrusion occurs because of the swelling, which is aggravated by thermal expansion at elevated temperatures. This change is affected not only by the water absorption ratio, but also by the shrinkage due to curing, the length of the portion over which the fiber is fixed in the V-groove, and the adhesion structure of V-groove substrate and fiber fixing substrate. It was found that it differs depending on the adhesives used, the structure of the fiber array and the fabrication conditions.

It is an object of the present invention to solve these conventional problems, and to prevent the occurrence of light reflections due to an increased volume of the peripheral adhesive B around the fibers.

SUMMARY OF THE INVENTION

To achieve these objects, according to a first aspect of the present invention, a fiber array housing a stripped fiber in a V-groove of a V-groove substrate is provided. The stripped fiber is fixed in the V-groove by a fiber fixing substrate, and is adhered by a peripheral adhesive B disposed around the stripped fiber. An end face of the peripheral adhesive B is recessed with respect to an end faces of the fiber. Thus, the end face of the peripheral adhesive B does not protrude from the fiber end face, even when the volume increases due to swelling by aging. As a result, the deformation stress at the entire adhesion interface is relieved and local exfoliations of the fiber end face as happened conventionally do not occur. Furthermore, the risk of light reflections or losses is eliminated.

According to a second aspect of the present invention, a recess depth x is related to a water absorption ratio φ of the peripheral adhesive B and a length L, by the equation x =0.1×(φ×L)/ 2. The reference letter "x" refers to a recess depth that the end face of the peripheral adhesive B is recessed with respect to the end face of the fiber. "L" refers to the length over which the optical fibers are adhered to the V-grooves. Thus, a suitable recess depth can be formed with the desired peripheral adhesive, adjusting the adhesion length. Moreover, it is possible to provide a fiber array with a coupling force resistant to aging.

It should be noted that the water absorption ratio φ means the ratio of volume increase.

According to a third or forth aspect of the present invention, a recess depth x is at least 0.1 μm. Thus, the end of the swelled adhesive does not stick out from the fiber end face, even when the volume of the peripheral adhesive B increases due to aging, so that it does not push against the end face adhesive A.

According to a fifth aspect of the present invention, the end face of the fiber is flush with the end face of the fiber array or protrude therefrom. Thus, the end face of the fiber is not recessed with respect to the end face of the fiber array, so that dirt can be easily removed from the fiber end faces by washing before the adhesion to the waveguide. Consequently, the risk of problems such as poor adhesion forces, light reflections and losses can be eliminated. These problems occur when the peripheral adhesive B is glued to the waveguide while there are still impurities adhering to the end face of the adhesive B.

According to a sixth aspect of the present invention, in a fiber array according to the third or fourth aspects, the end face of the peripheral adhesive B is recessed a distance y, which is at most 10 μm, with respect to the end faces of the fiber array. When the end face of the peripheral adhesive B is recessed at least 10 μm from the fiber array end face, impurities, such as grinding stone grains or other dirt can be removed by rinsing the end face of the fiber array or scraping the impurities out These impurities usually enter the recesses during polishing. Thus, there is no risk of poor adhesion, light reflections, or other losses which occur when the adhesion to the waveguide is performed while impurities still stick to the end face of the adhesive.

According to a seventh aspect of the present invention, in a fiber array of any of the first to fourth aspects, the peripheral adhesive B has a Young's modulus of at least 0.03GPa. Thus, the fiber can be securely fixed without positional shifts even when using one of the usual epoxy adhesives but with high Young's modulus.

According to an eighth aspect of the present invention, a method for fabricating a fiber array in which the end face of the peripheral adhesive B is recessed with respect to end faces of the fibers includes ashing or etching steps. After polishing an end face of the assembled fiber array, ashing or etching of the end face is performed at the end of the fiber array at which the end of the peripheral adhesive B and the end face of the fiber are located. Thus, leaving the quartz fibers and the substrate of the fiber array, the peripheral adhesive B can be oxidized away to form recess portions. In particular, if this is done immediately before coupling with the waveguides of the optical device, the recess portions are formed in the peripheral adhesive B at the same time it eliminates organic material on the adhesion surface. It improves the adhesion strength of the end face adhesive A bonding optical elements such as waveguides to the fiber array.

According to ninth aspect of the present invention, an optical device is optically connected/fixed to a fiber end face of a fiber array with the end face adhesive A. Examples of optical devices include optical waveguides, diodes, lenses, isolators, all types of bulk filters, as well as polarizers.

DETAILED DESCRIPTION OF THE INVENTION

The following is a detailed explanation of the preferred embodiments of the present invention, with reference to the accompanying drawings. Explanations regarding components and fabrication methods similar to those already explained for FIGS. 3(a)-(b) and FIGS. 4(a)-(c) have been omitted.

Figure 4:
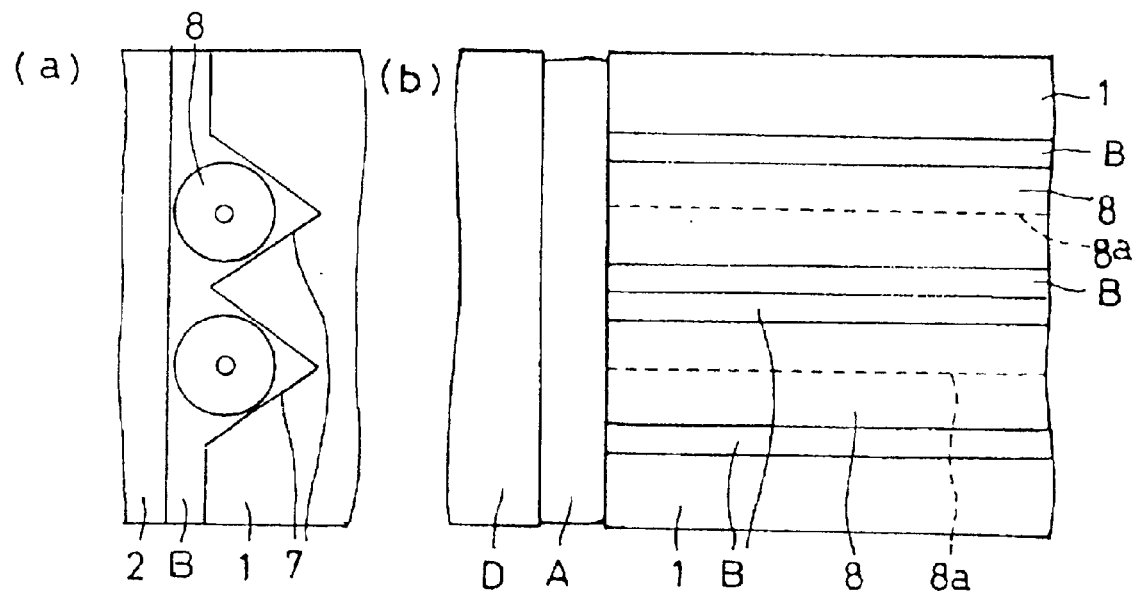
FIGS. 4(a)-(c) are partial magnifications of the circular portion in FIGS. 3(a) and 3(b).
Figure 4:
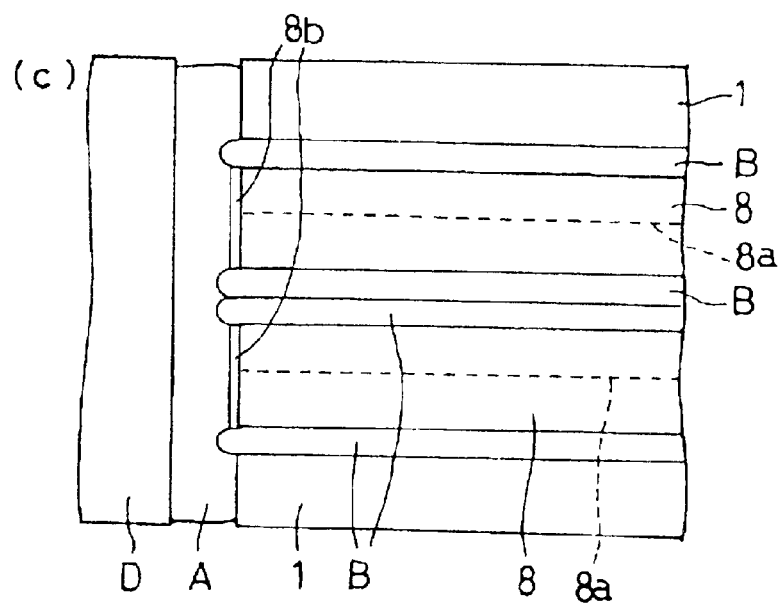

FIGS. 1(a)-(b) show a first embodiment of the present invention in a partial magnification similar to that of FIGS. 4(a)(c). Stripped fibers 8 are placed and positioned in V-grooves provided in a V-groove substrate 1, and are fixed by a peripheral adhesive B.

FIG. 1(a) is a cross-sectional view taken from above, showing the initial adhesion state. The stripped fibers are positioned such that they protrude beyond the end face 1a of the V-groove substrate 1, and the adhesive B is formed flush with the end face 1a of the V-groove substrate 1 and does not protrude beyond that end face 1a.

Figure 1:
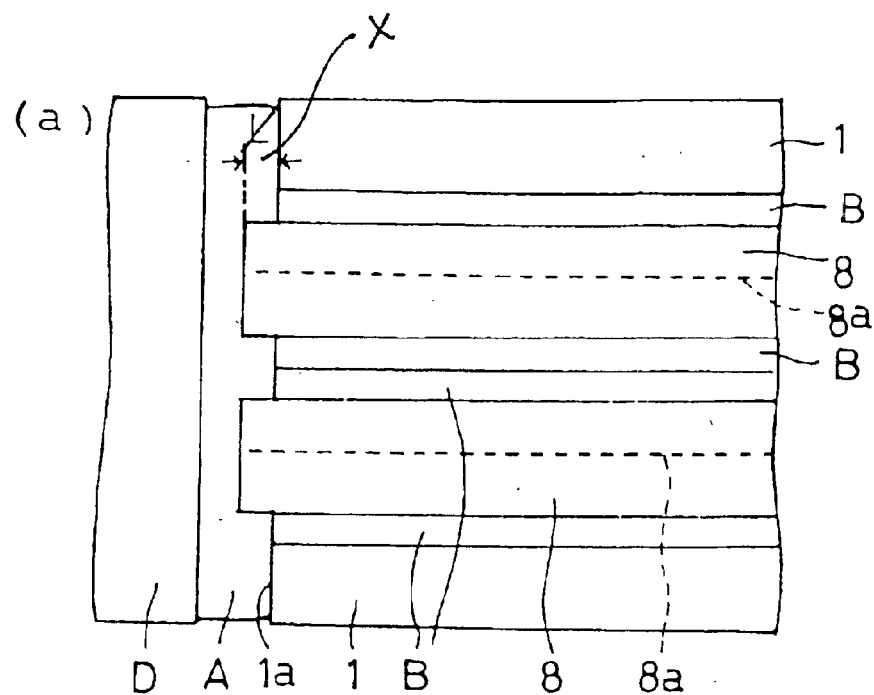
FIGS. 1 (a) and 1 (b) are diagrams illustrating an embodiment of the present invention.
Figure 1:
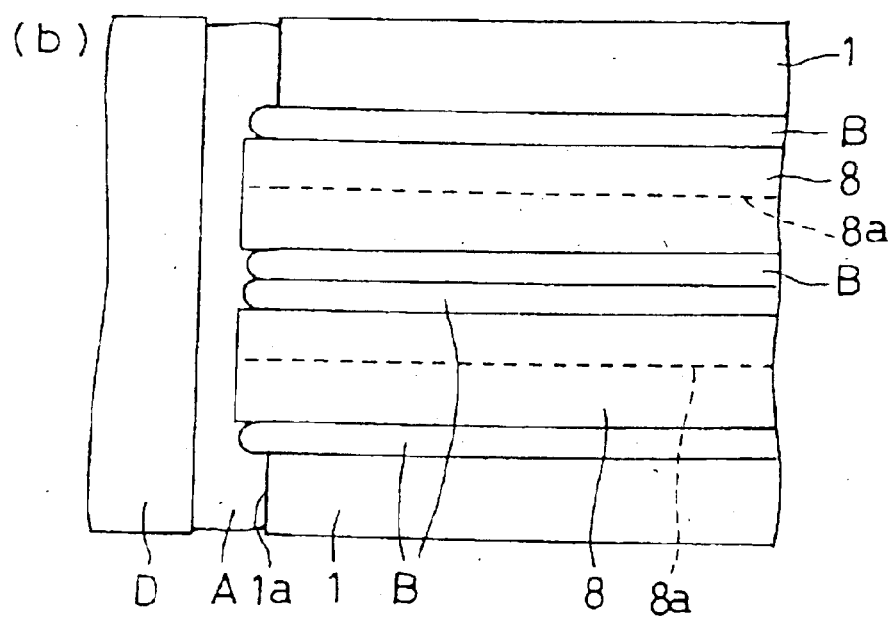

Then, as the adhesive B swells and extends in the longitudinal direction when subjected to high temperature and high humidity, it protrudes beyond the end face 1a of the V-groove substrate and out from the end face of the fiber array, as shown in FIG. 1 (b). However, the tip of the adhesive B does not go beyond the tips of the stripped fibers. Thus, the adhesive does not apply a stress that might lead to exfoliation on the junction face of the end face adhesive A.

Figure 2:
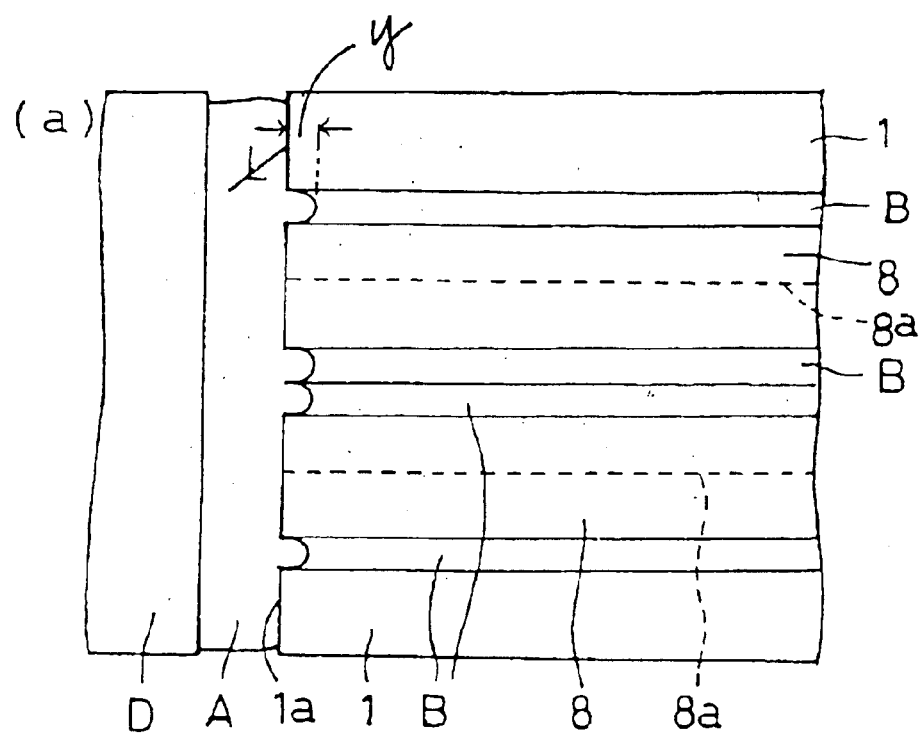
FIGS. 2(a) and 2(b) are diagrams illustrating another embodiment of the present invention.
Figure 2:
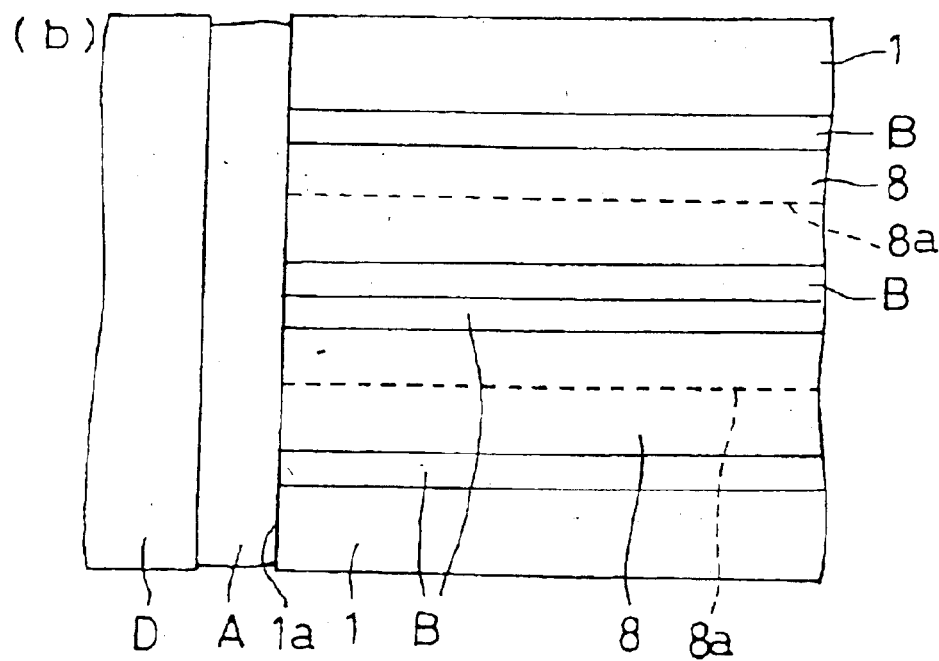
Figure 3:
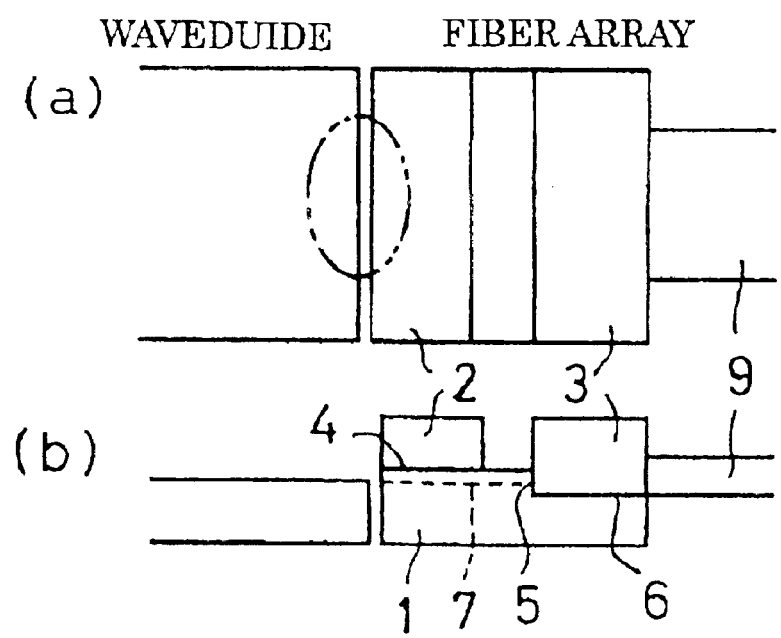
FIGS. 3(a) and 3(b) are diagrams illustrating a conventional fiber array.

FIGS. 2(a)-(b) show a second embodiment of the present invention in a cross section taken from above, similar to FIGS. 1(a)(b). While the optical fibers in the fiber array in FIG. 1(b) protrude from the fiber array, the optical fibers in the fiber array in FIG. 2(b) are formed flush with the fiber array. In the initial state shown in FIG. 2(a), the adhesive B forms a meniscus surface with respect to the gaps around the fibers, and the vicinity of the center of the meniscus surface is receded at least 0.1 μm and at most 10 μm from the fiber end face.

Then, when subjected to high temperature and high humidity, the adhesive B swells and extends in the longitudinal direction, and protrudes in outward direction from the initial state, as shown in FIG. 2(b). However, the tip of the adhesive B does not swell beyond the end face of the stripped fibers and the end face 1a of the V-groove substrate 1. As a result, it does not apply a stress that might lead to exfoliation on the junction face with the adhesive A.

The following is an explanation of a method for fabricating a fiber array, in which the end of the peripheral adhesive B is recessed with respect to the fiber end faces.

First, as a fabrication method suitable for the fiber arrays shown in FIGS. 1(a)(b) and FIGS. 2(a)-(b), the end face of the fiber array fastened to the waveguide is ashed or plasma etched in a polishing step, which is the last step for fiber arrays assembled in an ordinary fabrication process. Thus, leaving the quartz fibers, the peripheral adhesive B can be oxidized away to form recess portions. In particular, if this is done immediately before coupling with the waveguides, then the recess portions are formed in the peripheral adhesive B at the same time of eliminating organic material from the adhesion surface. This improves the adhesion strength of the end face adhesive A bonding optical elements such as waveguides to the fiber array.

A separate fabrication method, which is suitable as a fabrication method for the fiber array shown in FIGS. 2(a)-(b), is carried out before the usual last polishing step. That is to say, in the step of sandwiching the stripped fibers between the V-groove substrate 1 and the fiber fastening substrate 2 and fastening them with the peripheral adhesive B, the curing process is interrupted at a curing degree at which the fibers are held securely and protected during the polishing and fixing the adhesive B preliminarily. Then, the usual polishing process is carried out, and after forming the end face of the adhesive B flush with the end face of the fiber array, the preliminarily fixed adhesive B is cured all the way. Thus, the flush adhesive B shrinks by the curing in that last step, and the end face is drawn inward, forming recesses with respect to the fiber end face.

EXAMPLE

Fiber arrays accommodating 48 fibers were produced, which had a total longitudinal length of 12 mm, and the fibers were fixed in the V-grooves over a distance of 4 mm. For the peripheral adhesive B used in the assembly, an epoxy adhesive was selected that had a curing shrinkage ratio of 2%, a water absorption ratio of 0.5%, a thermal expansion coefficient of $1\times10^{-4}$, and a Shore D85 hardness. The previously mentioned method was used to form the recesses, and samples with different recess depth were produced, and when they were subjected to an accelerated aging test of 85° C/85%RH for 2 weeks, the following test results were obtained.

Figure 5:
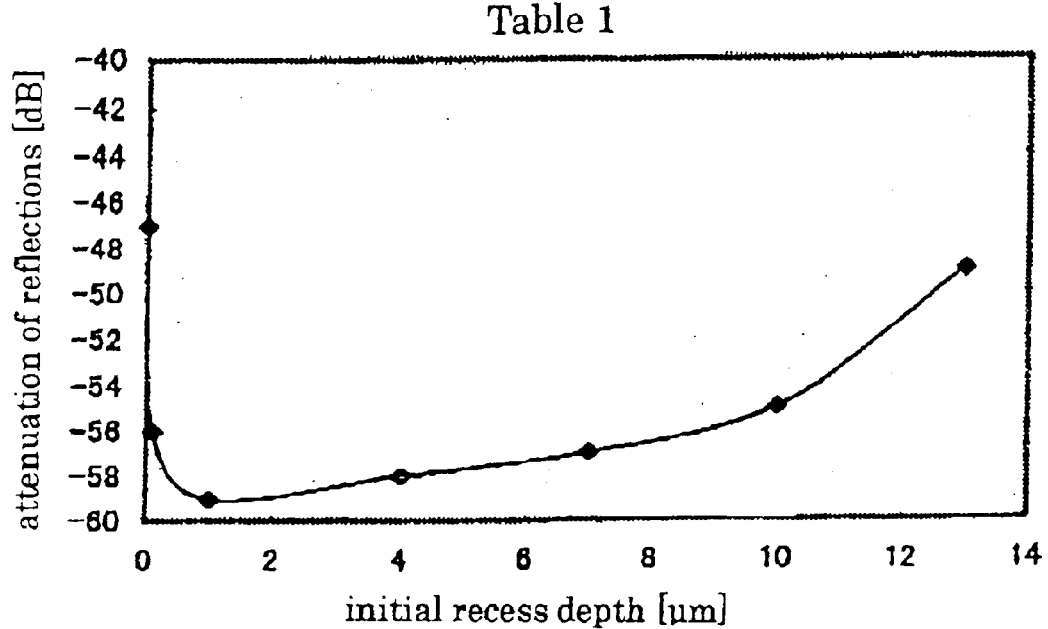
FIG. 5 is a graph illustrating a relationship between the initial recess depth of the peripheral adhesive and the attenuation of reflections according to the Example.

In accordance with those results, it is preferable that the recess depth is at least 0.1 μm and at most 10 μm. In particular if the recess depth is at least 0.1 μm, even when the volume of the peripheral adhesive B increases due to aging, the end of the swelled adhesive does not stick out from fiber end faces, so that it does not push against the end face adhesive A. On the other hand, if the recess depth is not more than 10 μm, then impurities can be removed by rinsing the end face of the fiber array or scraping. Thus, there is no risk of poor adhesion, light reflections, or other losses, which occurs when the adhesion to the waveguide is performed while impurities still stick to the end face of the adhesive. A graph of the relationship between the initial recess depth of the peripheral adhesive and the attenuation of reflections is shown in FIG. 5.

Furthermore, comparing epoxy adhesives with various Young's moduli, it was found that poor adhesions at the coupling face can be easily prevented simply by setting the recess depth when using an adhesive having a Young's modulus of at least 0.03GPa. The epoxy adhesive is used to fix the fibers into a certain position without positional shifts, so that the higher the Young's modulus is, the more effectively the epoxy adhesive can be used by setting the recess depth of the present invention, even when there is the adverse influence of protrusions at the coupling face.

Moreover, considering the relation between the recess depth x to the expansion ratio φ of the peripheral adhesive B and the length L over which the optical fiber is adhered, a relation x=f (φ, L) can be established. From this relation, a suitable recess depth can be formed, adjusted for the adhesion length, with the desired peripheral adhesive, thus providing a fiber array with a coupling force resistant to aging.

As explained above, in the fiber array of the present invention, stripped fibers are housed in V-grooves of a V-groove substrate and are fixed in the V-grooves by a fiber fixing substrate. The fibers are fastened by a peripheral adhesive B that is disposed around the fibers, and the end of the peripheral adhesive B is recessed with respect to an end face of the fibers. Thus, even in the case of a volume increase due to swelling caused by aging, the end face of the peripheral adhesive B does not protrude from the fiber end faces. This leads to deformation stress that loosens the entire adhesive interface or local exfoliation of the fiber end faces as in the related art, and the risk of light reflections is eliminated.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description. All changes that come within the meaning and range of equivalency of the claims are intended to be embraced therein.

What is claimed is:

1. A fiber array housing a stripped fiber in a V-groove of a V-groove substrate comprising:
   a fiber fixing substrate fixing said stripped fiber; and
   a peripheral adhesive disposed around said stripped fiber;
   wherein an end face of said peripheral adhesive is recessed depth x with respect to an end face of said fiber, said recess depth x being at least 0.1 μm and no more than 10 μm.

2. The fiber array according to claim 1, wherein said recess depth x that said end face of said peripheral adhesive is recessed with respect to said and face of said fiber is related to a water absorption ratio φ of said peripheral adhesive and a length L over which said optical fiber is adhered to said V-groove by the equation x=0.1(φL)/2.

3. The fiber array according to claim 1, wherein said end face of said fiber is flush with end face of said fiber array or protrudes therefrom.

4. The fiber array according to claim 1, wherein said end face of said peripheral adhesive is recessed at most 10 μm from an end face of said fiber array.

5. The fiber array according to claim 1, wherein said peripheral adhesive has a Young's modulus of at least 0.03GPa.

6. A method for fabricating a fiber array according to claim 1, wherein said end face of said peripheral adhesive is recessed with respect to said end face of said fiber, comprising the steps of:

assembling said fiber array, first polishing an end face of said assembled fiber array; and then ashing or etching said end face of said fiber array at which said end face of said peripheral adhesive and said end face of said fiber are located.

7. An optical device that is connected/fixed to a fiber array according to claim 1.

8. A fiber array housing a stripped fiber in a V-groove of a V-groove substrate comprising:

a fiber fixing substrate fitting said stripped fiber, and a peripheral adhesive disposed around said stripped fiber, wherein an end face of said peripheral adhesive is recessed a depth x with respect to an end face of said fiber; and wherein said recess depth x is related to a water absorption ratio φ of said peripheral adhesive and a length L over which said optical fiber is adhered to said V-groove groove by the equation $x=0.1(\phi L)/2$.

9. The fiber array according to claim 8, wherein said recess depth x is at least 0.1 μm.

* * * * *

UNITED STATES PATENT AND TRADEMARK OFFICE
CERTIFICATE OF CORRECTION

PATENT NO. : 6,798,969 B2
DATED : September 28, 2004
INVENTOR(S) : Akira Matsumoto and Masashi Fukuyama It is certified that error appears in the above-identified patent and that said Letters Patent is hereby corrected as shown below:

Title page,
Item [75], Inventors, change "Nagaya" to -- Nagoya --

Column 4,
Line 47, change "4(a)(c)" to -- 4(a)-(c) --
Line 66, change "1(a)(b)" to -- 1(a)-(b) --

Column 5,
Line 19, change "1(a)(b)" to -- 1(a)-(b) --

Column 6,
Line 55, add -- a -- after "recessed"
Line 60, change "and" to -- end --
Line 65, add -- an -- after "with"

Column 8,
Line 5, change "fitting" to -- fixing --
Line 13, delete "groove" after "V-groove"

Signed and Sealed this

Fourth Day of January, 2005

JON W. DUDAS
*Director of the United States Patent and Trademark Office*